(12) United States Patent
West

(10) Patent No.: US 11,700,331 B2
(45) Date of Patent: *Jul. 11, 2023

(54) SYSTEM AND METHOD FOR MULTI-MODE CUSTOMER SERVICE INTERACTION

(71) Applicant: Verint Americas Inc., Alpharetta, GA (US)

(72) Inventor: Graeme Robert West, Glasgow (GB)

(73) Assignee: Verint Americas Inc., Alpharetta, GA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/410,104

(22) Filed: Aug. 24, 2021

(65) Prior Publication Data

US 2021/0385333 A1     Dec. 9, 2021

Related U.S. Application Data

(63) Continuation of application No. 16/390,708, filed on Apr. 22, 2019, now Pat. No. 11,102,352.

(51) Int. Cl.
  *H04M 3/51* (2006.01)
  *G06Q 30/016* (2023.01)
  *H04M 3/00* (2006.01)
(52) U.S. Cl.
  CPC ........ *H04M 3/5191* (2013.01); *G06Q 30/016* (2013.01); *H04M 3/007* (2013.01)

(58) Field of Classification Search
  None
  See application file for complete search history.

(56) References Cited

U.S. PATENT DOCUMENTS

| | | | |
|---|---|---|---|
| 8,340,255 B2 | 12/2012 | Rotsztein et al. | |
| 8,976,953 B2 | 3/2015 | Peterson | |
| 9,064,259 B2 | 6/2015 | Aleksin et al. | |
| 9,992,334 B2 | 6/2018 | Mauro et al. | |
| 10,200,536 B2 | 2/2019 | Klein et al. | |
| 2007/0116237 A1 | 5/2007 | Katcam et al. | |
| 2013/0215071 A1 | 8/2013 | Pasquero et al. | |
| 2013/0260834 A1* | 10/2013 | Ingalls | H04M 1/605 455/566 |
| 2019/0037077 A1* | 1/2019 | Konig | H04M 3/5183 |

* cited by examiner

*Primary Examiner* — Nafiz E Hoque
(74) *Attorney, Agent, or Firm* — Christopher M. Scherer; Erin Ella Block; DeWitt LLP

(57) ABSTRACT

The present application includes a method and system for multi-channel interaction. A communication session is initiated between a customer service representative (CSR) and an end user. Multi-channel communication is used between the end user and the CSR. The multi-channel communication includes at least voice and data. Information is presented to the end user via a user interface, and the user can confirm the accuracy of the information using the user interface.

20 Claims, 10 Drawing Sheets

SYSTEM AND METHOD FOR MULTI-MODE CUSTOMER SERVICE INTERACTION

CROSS-REFERENCE TO RELATED APPLICATIONS

This application is a continuation of U.S. patent application Ser. No. 16/390,708, filed Apr. 22, 2019, the content of which is incorporated herein by reference in its entirety.

FIELD

The present disclosure is directed to a system and method for computer analysis, specifically a system and method for multi-mode customer service interaction.

BACKGROUND

In a modern high-volume customer engagement center (CEC), customer service representatives (CSRs) typically interact with a high volume of customers via telephone. In such interactions, the CSRs typically receive information orally from the customer and then input this oral information into a computer system such a customer resource management (CRM) system, order entry system, or other similar system. This manual entry of customer information by the CSR can be time-consuming and result in errors.

In situations where financial information such as credit card information may be exchanged, added security measures are preferable and at times required by applicable laws or regulations. For example, when credit card information is involved, the entity obtaining this information must typically comply with payment card industry (PCI) data security standards (DCCs). One aspect of compliance with PCI DCCs involves situations where a customer's credit card number is captured during the audio recording of a call between a CSR and end user such as a customer. In these situations, it is desirable to omit the credit card numbers and other sensitive authentication information (SAD) from being recorded. Additionally, it is desirable to avoid having the CSR obtain or interact with any SAD at all.

In other aspects, it is often desirable to prevent CSRs from having access to other sensitive information while still maintaining a voice communication channel with the customer. In other aspects, it is often desirable to have customers verify the accuracy of information on a user interface while maintaining a voice communication channel with a CSR.

There is an unmet need in the art for a system and method capable of securing rich, multi-channel interaction from a customer using a dynamic interface for inputting secure data.

SUMMARY

An exemplary embodiment of the present application is a method for real-time multi-channel interaction. A real-time communication session is initiated between a customer service representative (CSR) and an end user. Multi-channel communication is used between the end user and the CSR. The multi-channel communication includes at least voice and data. Information is presented to the end user via a user interface, and the user can confirm the accuracy of the information using the user interface. In another aspect, the information is presented to the user using at least audio. In another aspect, the user can change the information presented using the user interface. In another aspect, the information input by the user cannot be accessed by the CSR.

The objects and advantages will appear more fully from the following detailed description made in conjunction with the accompanying drawings.

BRIEF DESCRIPTION OF THE DRAW NG(S)

DETAILED DESCRIPTION OF THE DRAWING(S)

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

A multi-channel interaction (MCI) system overcomes the drawbacks of a traditional voice channel system by providing a blended mode of customer interaction with an agent, such as a CSR, and a dynamic user interface for inputting secure data. This MCI system typically enables, among other things, high transaction security, low average handling times, and the flexibility of a human operator. Such benefits are not typically available from conventional telephony, web, or mobile interaction modes alone.

Figure 1:
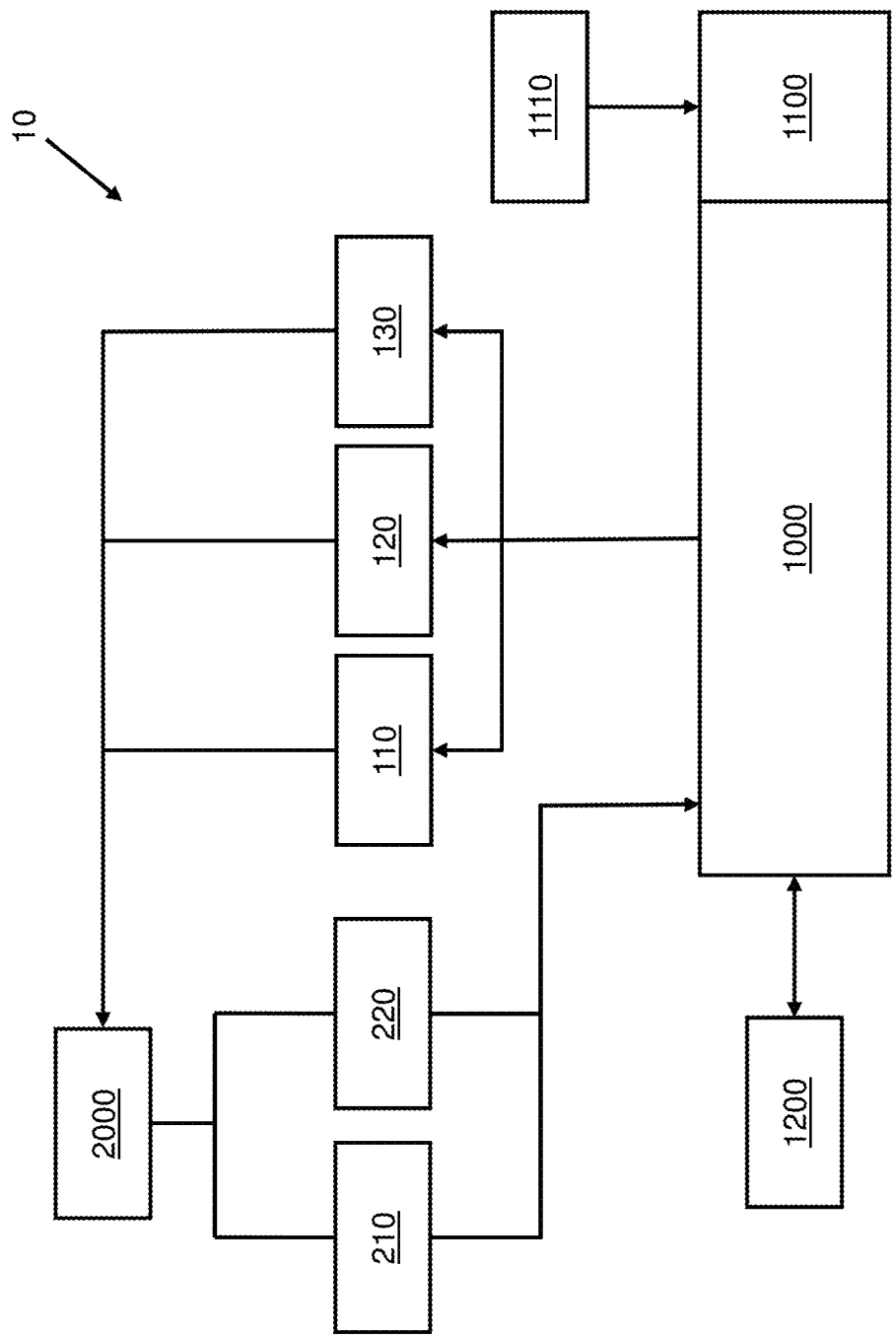
FIG. 1 depicts an exemplary embodiment of a block diagram for the components of the present disclosure.

FIG. 1 depicts an exemplary embodiment of an MCI system 10 for multi-channel interaction. The MCI system 10 includes an interaction engine 1000 that is in selective communication with a user interface 2000. One or more of communication inputs 210 and 220 and one or more of engine outputs 110, 120, 130 are selectively transmitted between engine 1000 and user interface 2000. Additional communication inputs and engine outputs may be added as desired.

Interaction Engine

Interaction engine 1000 typically includes one or more communication inputs 210, 220 used to collect and coordinate various communication channels and modalities (e.g., voice and input) during a CSR interaction with a customer or other end user. In certain embodiments, inputs 210, 220 are generated through a combination of text and pre-designated selections. In certain embodiments, the inputs may be generated by other means. Interaction engine 1000 includes a set of analytics rules 1110 used to analyze information received by engine and selectively generate one or more outputs 110, 120, 130 for transmission back to the end user via interface 2000. The analytics rules 1110 may be user-generated or pre-generated, and may be updated by users. The analytics rules 1110 may be a software program or programs, or a separate file or files executed by a software program. A nonlimiting example of an analytics rule 1110 is provided below in the discussion of "blind" mode.

User Interface

User interface 2000 is most commonly a smartphone but can likewise be a laptop computer or other device in which audio and text information can be transmitted. When user interface 2000 is a smartphone, the voice channel can typically be held open in any mode using the speakerphone functionality of the smartphone. The interface 2000's sensors (not shown) are used to disable data input screens and the speakerphone function whenever the end user resumes a call in "voice only" mode by raising the interface 2000 back to the end user's face.

Communication Modes

MCI system 10 can typically operate in four (4) modes: (1) data entry; (2) blind; (3) decision; and (4) confirmation. Various combinations of these modes can be used during a session between a CRS and end user. In each of these modes, the interface 2000 will typically be alternatively operating as a speakerphone during certain operations and as a handset phone in which the interface is held against the face of the end user with the audio speaker proximate the ear of the end of user. The communication between the CSR and end user will typically be real-time multi-channel communication.

Data Entry Mode

Figure 2A:
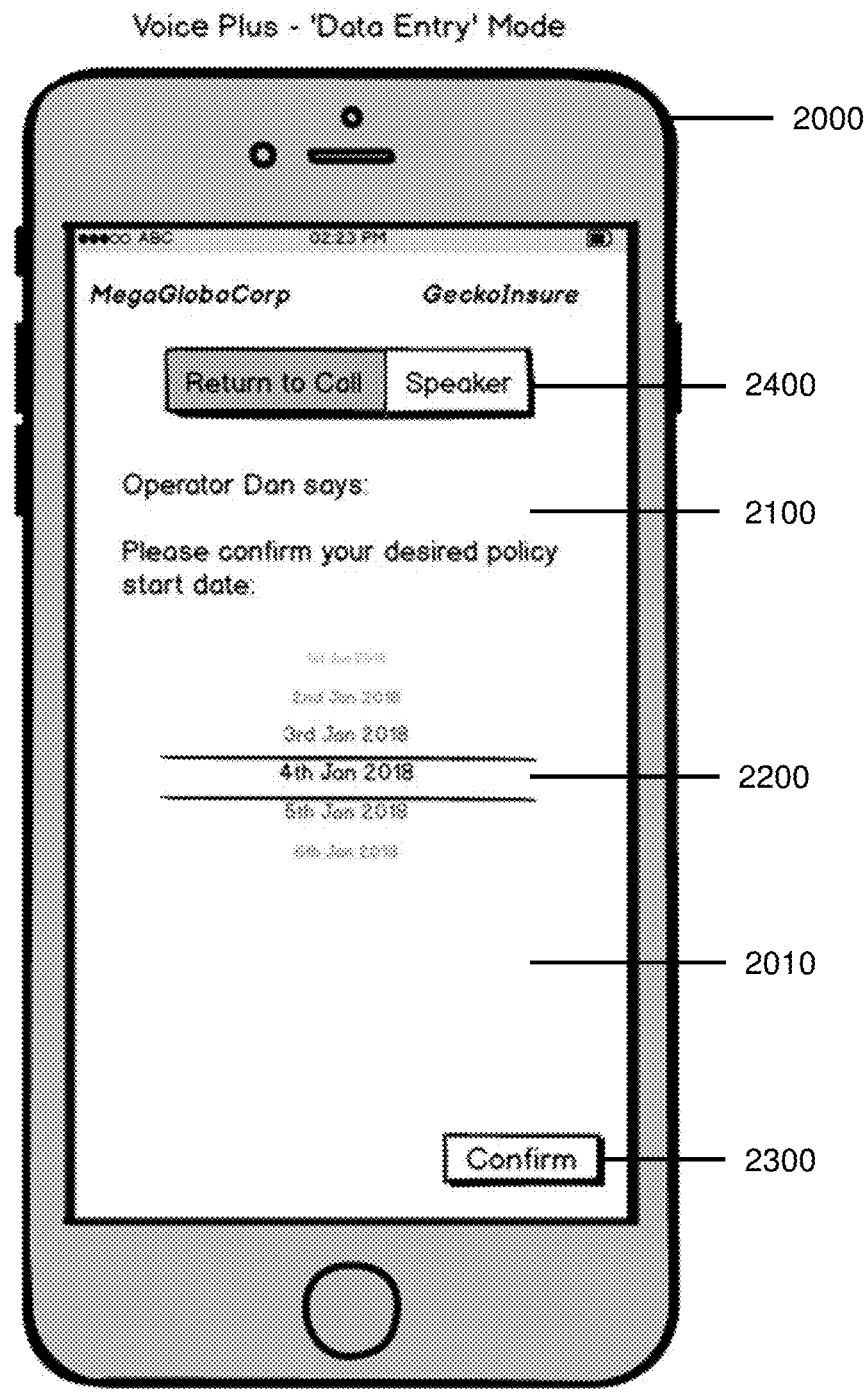
FIG. 2a depicts an exemplary user interface in a data entry mode according to an aspect of the present disclosure.

Referring to FIG. 2*a*, an example session in "data entry" mode is shown. Here, a query 2100 to an end user (not shown) is displayed on the screen 2010 of interface 2000. In response, the end user selects the correct information 2200 to accurately respond to the query. Here, by way of nonlimiting example, the end user is confirming the date upon which the user desires an insurance policy to begin. The end user will transmit the information 2200 to interaction engine 1000 (see FIG. 1) by selecting the confirm button 2300 on interface 2000. Once transmitted to interaction engine 1000, information 2200 becomes available to the CSR for continued interaction with the end user. Examples of information 2200 that can be input using this data entry mode include addresses, date of birth, and capturing a photograph of the end user's face for identity verification purposes by using a camera built into the interface 2000.

Figure 2B:
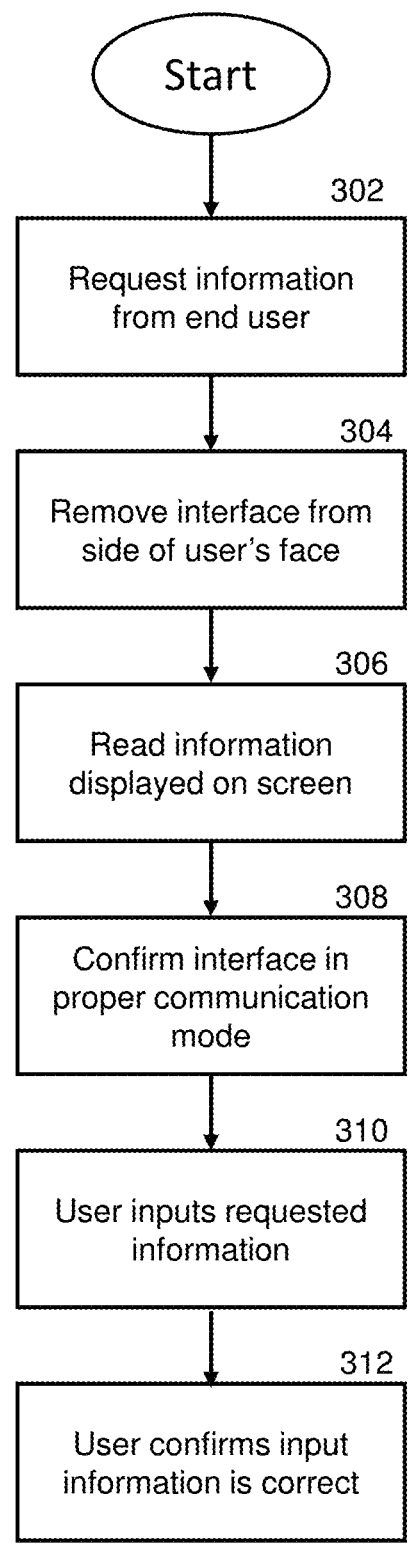
FIG. 2b depicts a flowchart of an exemplary embodiment of method for information entry in data entry mode according to an aspect of the present invention.

Referring to FIG. 2*b*, a flowchart depicts an exemplary embodiment of information entry in data entry mode. In this nonlimiting example, the end user is obtaining information about an insurance policy using a smartphone as interface 1000. At step 302, the CSR presents the end user with a question requesting information from end user. In one nonlimiting example of step 302, the CSR asks orally when the end user would like an insurance policy to commence. At step 304, the end user removes the interface 2000 from the side of user's face so that user can read information displayed on the screen of interface 2000. At step 306, the user reads the information displayed on the screen of interface 2000. In this nonlimiting example, the user reads the question, "Please confirm your desired policy start date:". At step 308, the user confirms that interface is in the proper audio communication mode. Here, user confirms that interface 2000 is operating in speakerphone mode, which is confirmed by the "speaker' button 2400 being highlighted on the screen 2010 of interface 2000. At step 310, the user inputs the requested information. In this nonlimiting example, the user dials the date wheel to select a desired date of 4 Jan. 2018." At step 312, the user confirms the input information is correct. In this nonlimiting example, the user selects the "confirm" button 2300 on the screen 2010.

Blind Entry Mode

Figure 3A:
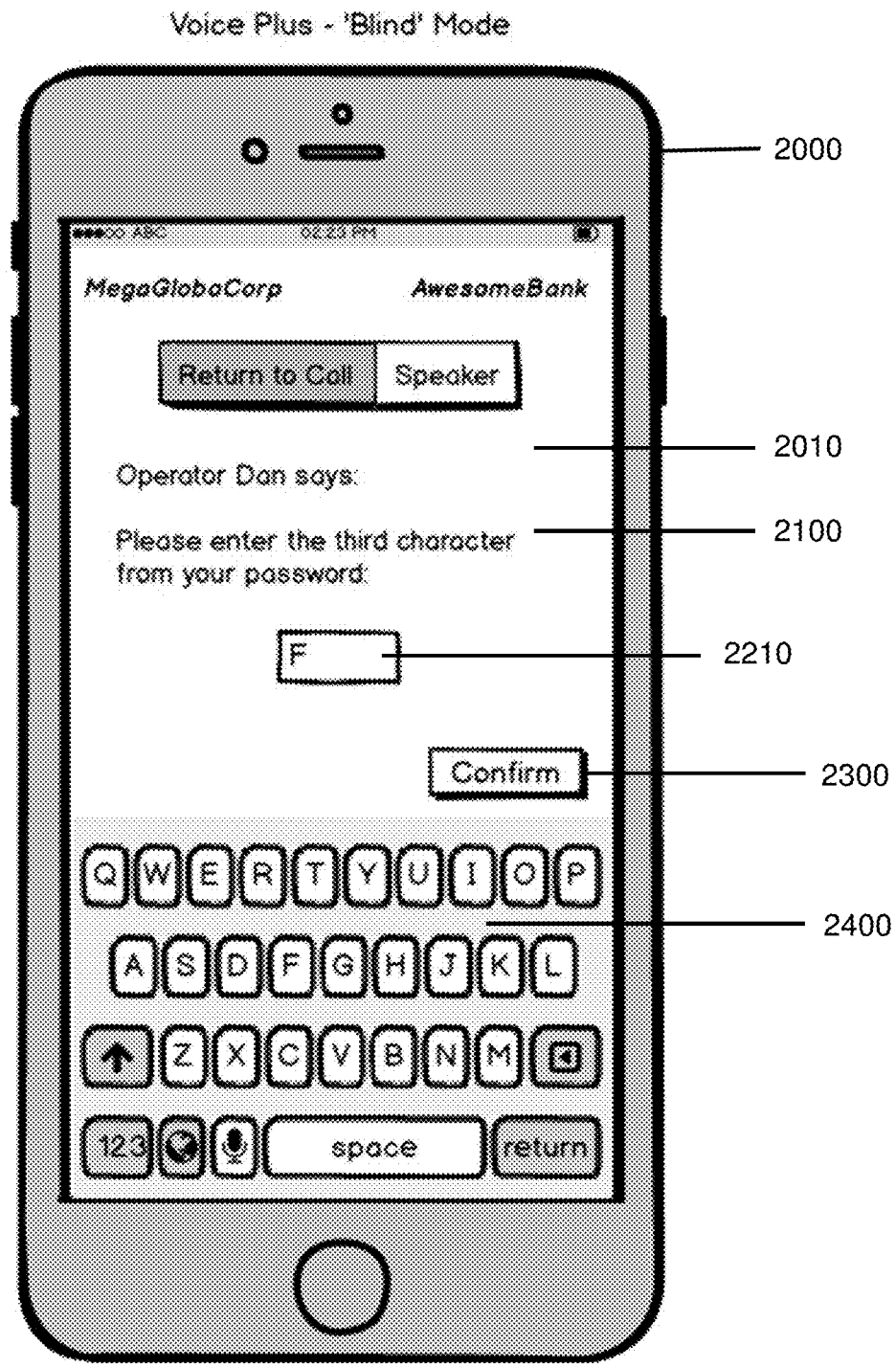
FIG. 3a depicts an exemplary user interface in a blind mode according to an aspect of the present disclosure.

Referring to FIG. 3*a*, an example session in "blind" entry mode is shown. Here, a query 2100 to the end user (not shown) is displayed on the screen 2010 of interface 2000. In response, the end user inputs the correct information 2210 to accurately respond to the query. Here, the end user is entering the third character from a password previously set by the end user. The end user will transmit the information 2210 to interaction engine 1000 by selecting the confirm button 2300 on interface 2000. Once transmitted to interaction engine 1000, information 2210 is not transmitted to CSR. Instead, interaction engine 1000 typically notifies CSR that information 2210 has been properly input by the end user without disclosing the information 2210 itself to the CSR. This blind entry mode is typically used when sensitive information is being input by the end user and it is desirable to prevent the CSR from having access to this information. Nonlimiting examples of such sensitive information include credit card numbers, social security numbers, and medical information.

Figure 3B:
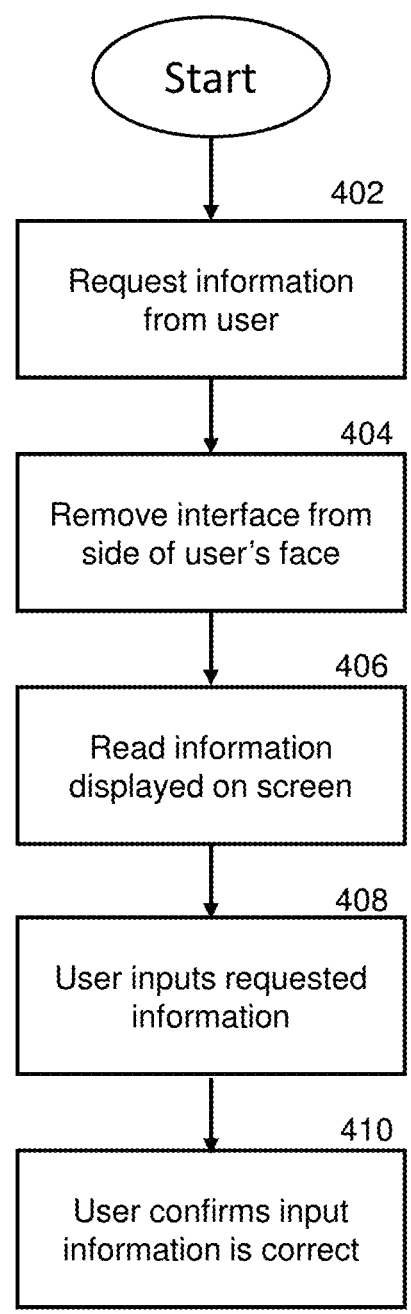
FIG. 3b depicts a flowchart of an exemplary embodiment of method for information entry in a blind mode according to an aspect of the present invention.

Referring to FIG. 3*b*, a flowchart depicts an exemplary embodiment of information entry in blind entry mode. In this nonlimiting example, the end user is asked to confirm an aspect of a password previously set by the end user. At step 402, CSR orally requests end user to confirm an aspect of end user's password using the screen 2010 of interface 2000. At step 404, the end user removes the interface from the side of end user's face. At step 406 the end user reads the question displayed on the screen 2010. In this nonlimiting example, the following question is displayed on screen 2010, "Please enter the third character from your password: ". At step 408, the end user inputs the requested information 2210 using the interface. In this nonlimiting example, the end user uses the touchscreen keyboard 2400 displayed on screen 2010 to input the letter "F". At step 410, the end user then confirms that the input information is correct. In this nonlimiting example, the end user selects the "confirm" button 2300 shown on screen 2010. By way of nonlimiting example, following is an example of an analytics rule 1110 that may be utilized in connection with this blind entry mode. A random password field capture rule may be used in this "blind mode" for communication with the interaction engine 1100 during usage. This rule may be selected manually or inferred automatically based on the relevant field type (being a secure data field).

Decision Entry Mode

Figure 4A:
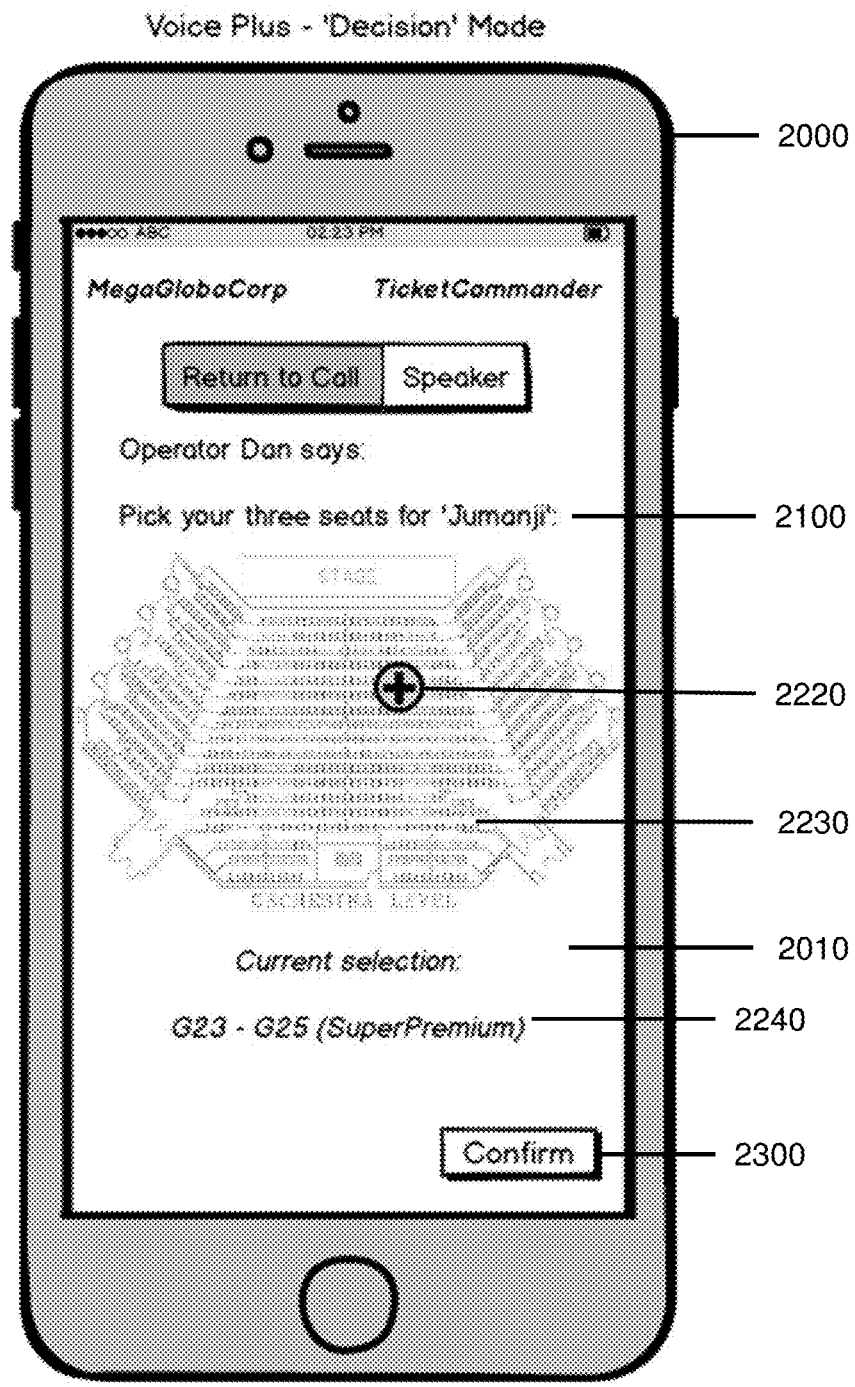
FIG. 4a depicts an exemplary user interface in a decision mode according to an aspect of the present disclosure.

Referring to FIG. 4*a*, an example session in "decision" entry mode is shown. The typical purpose of this "decision" entry mode is to allow the end user to pick one or more choices from a variety of pre-defined options, which are presented visually on the interface 2000. These choices would otherwise typically require complex mental visualisation or contextual understanding when using voice communication alone. Here, a query 2100 to the end user (not shown) is displayed on the interface 2000. In response, the end user inputs the correct information 2220 to accurately respond to the query based upon a variety of options 2230 presented on the interface 2000. Here, the end user is selecting the desired seat location 2200 for a movie showing. The end user will transmit the information 2200 to interaction engine 1000 by selecting the confirm button 2300 on interface 2000. Once transmitted to interaction engine 1000, information 2220 is typically transmitted to CSR. Such transmission enables the CSR to provide additional information to the end user based upon information 2220. Non-limiting examples of situations in which decision entry mode are used include ticketed events such as movies, theater and concerts as well as travel accommodations where a seat may be selected.

Figure 4B:
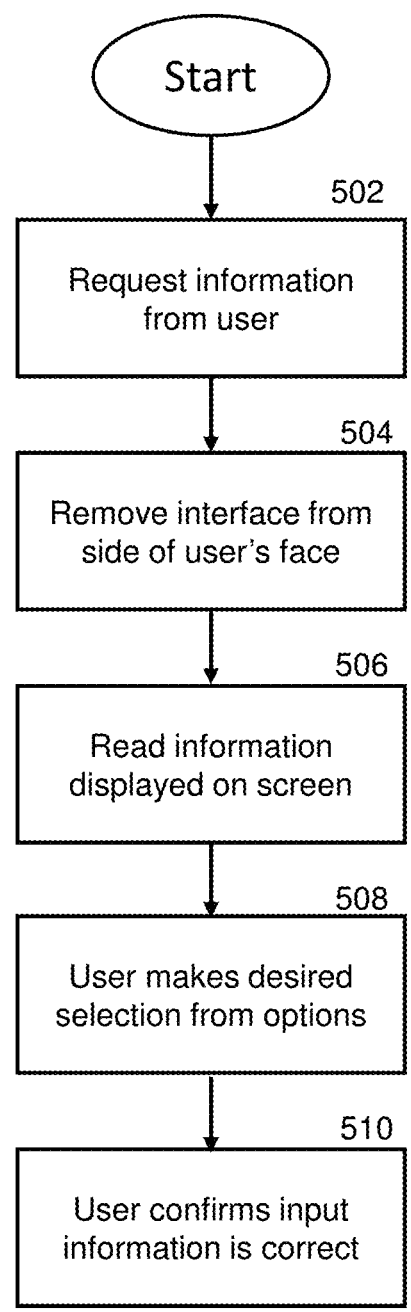
FIG. 4b depicts a flowchart of an exemplary embodiment of method for information entry in a decision mode according to an aspect of the present invention.

Referring to FIG. 4b, a flowchart depicts an exemplary embodiment of information entry in decision entry mode. In this nonlimiting example, the end user is asked to select desired seats for a move showing. At step 502, CSR orally requests end user to input requested information using the screen 2010 of interface 2000. At step 504, the end user removes the interface from the side of end user's face. At step 506 the end user reads the question displayed on the screen 2010. In this nonlimiting example, the following question is displayed on screen 2010, "Pick your three seats for 'Jumanji':". At step 508, the user makes the desired selection from the options 2230 displayed on interface 2000. In this nonlimiting example, the end user selects seats G23 (i.e., the $23^{rd}$ seat in row G), G24, and G25. At step 510, the end user confirms that the input information 2220 is correct. In this nonlimiting example, the end user selects the "confirm" 2300 button shown on screen 2010 after confirming that the following information 2240 is correct "Current selection: G23-G25 (SuperPremium)".

Confirmation Entry Mode

Figure 5A:
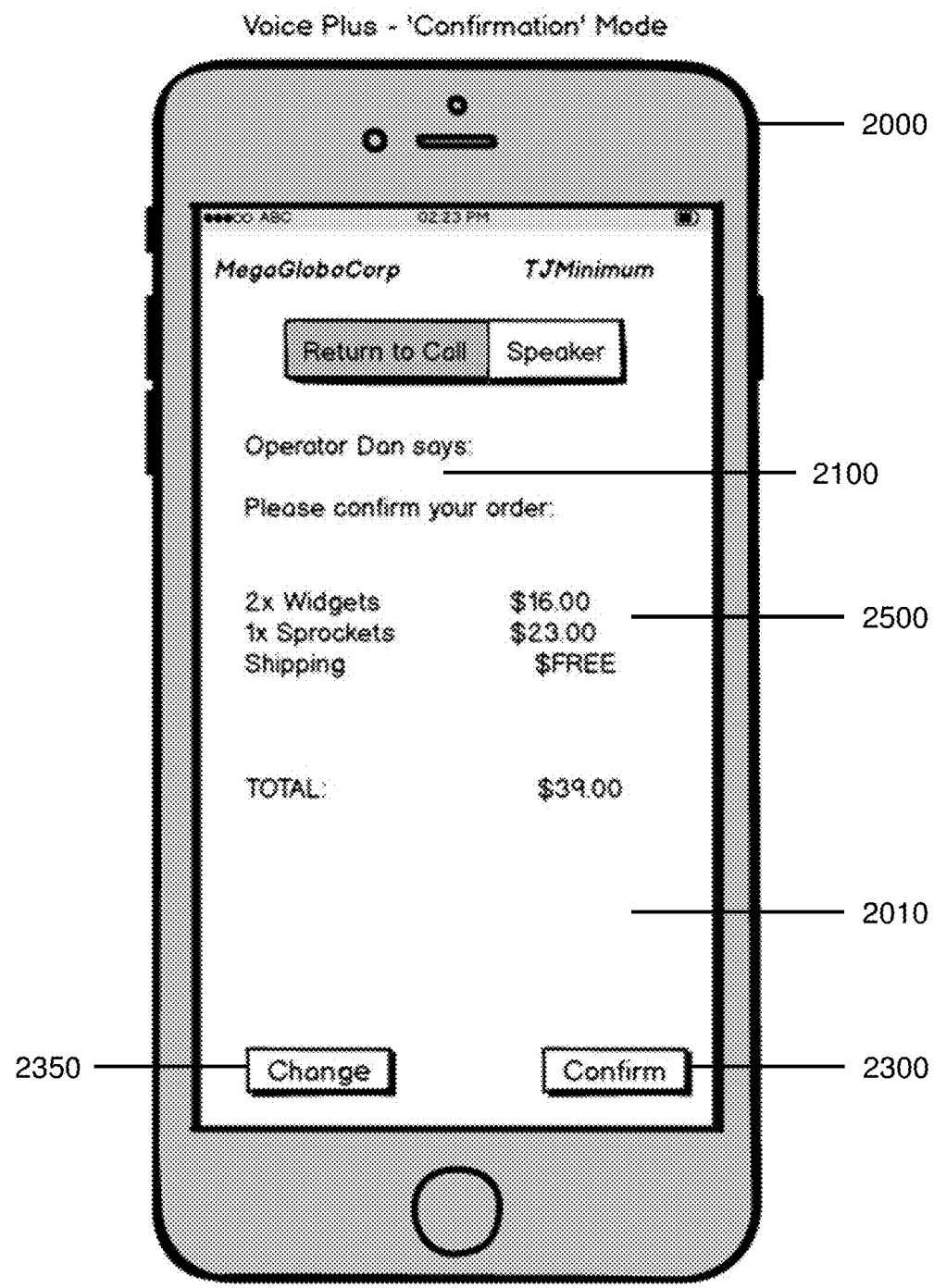
FIG. 5a depicts an exemplary user interface in a confirmation mode according to an aspect of the present disclosure.

Referring to FIG. 5a, an example session in "confirmation" entry mode is shown. Here, information 2500 is displayed on the interface 2000 to be confirmed as accurate by the end user (not shown). In response, the end user confirms the accuracy of the information 2500 by selecting "confirm" 2300 or selects "change" 2350 to indicate that information 2500 is not accurate. Interaction engine 1000 will transmit additional information 110 to interface in response to the end user confirm 2300 or change 2350 selection. If change 2350 is selected, the user will typically interact with the CSR to update the information displayed on interface 2000. The information can be updated using the modes described in this disclosure.

Figure 5B:
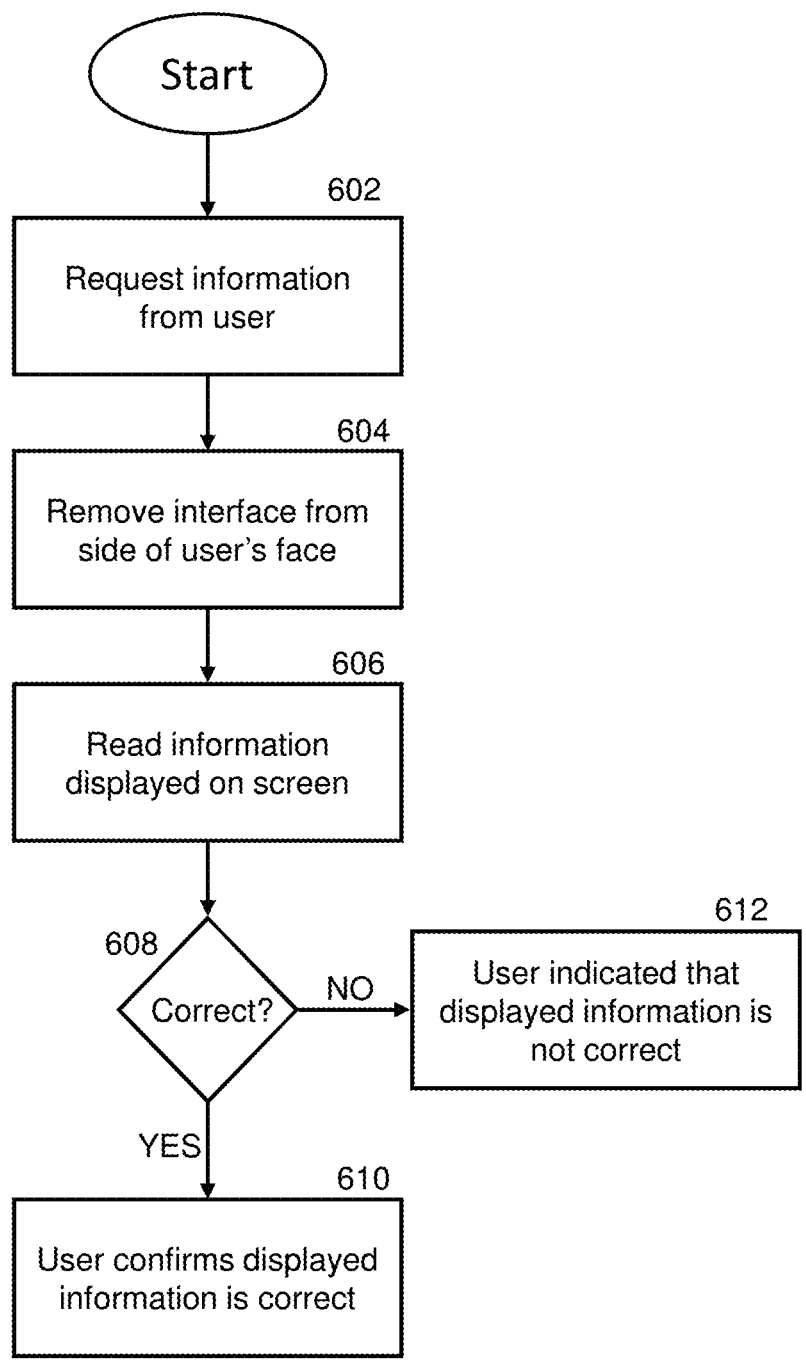
FIG. 5b depicts a flowchart of an exemplary embodiment of method for information entry in a confirmation mode according to an aspect of the present invention.

Referring to FIG. 5b, a flowchart depicts an exemplary embodiment of information entry in confirmation entry mode. In this nonlimiting example, the end user is asked to confirm that a product order is correct. At step 602, the CSR orally requests end user to confirm that information displayed on interface 2010 is correct. At step 604, the end user removes the interface from the side of end user's face. At step 606, the end user reads the information displayed on the screen 2010. In this nonlimiting example, the following question 2100 is displayed on screen 2010, "Please confirm your order:
2× Widgets $16.00
1× Sprockets $23.00
Shipping $ FREE
TOTAL: $39.00".

At step 608, the user determines whether the information 2500 displayed on screen 2010 is correct. If the information 2500 is correct, at step 610 the user confirms that the information 2500 is correct, typically by selecting the confirm 2300 button on screen 2010. If the information 2500 is not correct, at step 612 the user indicates that information 2500 is not correct by selecting the change 2350 button on screen 2010.

Figure 6:
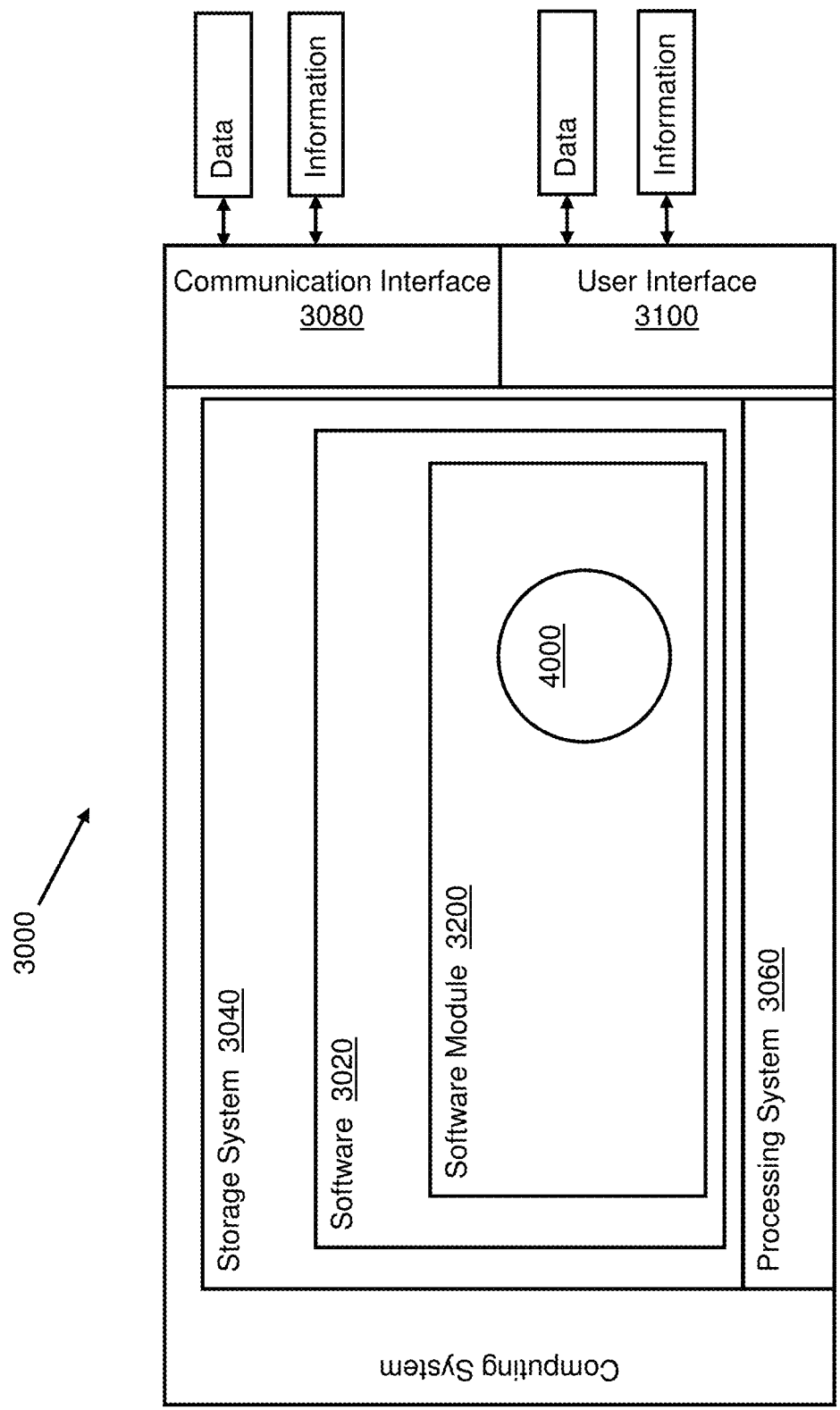
FIG. 6 depicts an exemplary embodiment of a system capable of securing rich, multi-channel interaction from a customer using a dynamic interface for inputting secure data.

Referring to FIG. 6, the system 10 is generally a computing system 3000 that includes a processing system 3060, a storage system 3040, software 3020, a communication interface 3080, and a user interface 3100. The processing system 3060 loads and executes software 3020 from the storage system 3040, including a software module 3200. When executed by computing system 3000, software module 3200 directs the processing system 3060 to operate as described herein in further detail in accordance with the method 4000. Method 4000 includes, without limitation, the methods described in connection with FIGS. 2a, 2b, 3a, 3b, 4a, 4b, 5a, and 5b.

The computing system 3000 includes a software module 3200 for performing the function of interaction engine 1000. Although computing system 3000 as depicted in FIG. 6 includes one software module 3200 in the present example, it should be understood that more modules could provide the same operation. Similarly, while the description as provided herein refers to a computing system 3000 and a processing system 3060, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 3060 can comprise a microprocessor and other circuitry that retrieves and executes software 3020 from storage system 3040. The processing system 3060 can be implemented within a single processing device but can also be distributed across multiple processing devices or sub-systems that cooperate in existing program instructions. Examples of processing systems 3060 include general purpose central processing units, application specific processors, and logic devices, as well as any other type of processing device, combinations of processing devices, or variations thereof.

The storage system 3040 can comprise any storage media readable by processing system 306, and capable of storing software 3020. The storage system 3040 can include volatile and non-volatile, removable and non-removable media implemented in any method or technology for storage of information, such as computer readable instructions, data structures, program modules, or other information. The storage system 3040 can be implemented as a single storage device but may also be implemented across multiple storage devices or sub-systems. The storage system 3040 can further include additional elements, such a controller capable of communicating with the processing system 3060.

Examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 3000.

As described in further detail herein, computing system 3000 receives and transmits data through communication interface 3080. The data can include verbal or textual communications to or from a customer and details about a request, a work order, a back-office task, or another set of data that will necessitate an interaction between a customer and the CSR. In embodiments, the communication interface 3080 also operates to send and/or receive information, such as, but not limited to, information to/from other systems to which computing system 3000 is communicatively connected, and to receive and process information from system inputs 210 220, as described in greater detail above.

The user interface 2000 described herein can include one or more system inputs, a mouse, a keyboard, a voice input device, a touch input device for receiving a gesture from a user, a motion input device for detecting non-touch gestures and other motions by a user, and/or other comparable input devices and associated processing elements capable of receiving user input from a user. Output devices such as a video display or graphical display can display documents or another interface further associated with embodiments of the system and method as disclosed herein. Speakers, printers, haptic devices and other types of output devices may also be included in the user interface 2000. CSRs or other staff can communicate with computing system 3000 through the user interface 3100 in order to view documents, enter or receive data or information, enter information into system inputs, manage an interaction or back-office task, or any number of other tasks the CSR or other staff may want to complete with computing system 3000.

The usage of system 10 presents many advantages and advances over conventional data entry systems. System 10 can enhance PCI compliance by negating the need for operators to interact with payment or other secure data directly. The secure data is typically captured through a secure API channel out of band. System 10 can reduce average handling times by making awkward data entry tasks faster and easier to confirm. System 10 can reduce failed interactions resulting from bad data collection (e.g., incorrect addresses or misspelt names), increasing first call resolution figures. System 10 can permit trained CSRs to provide expert advice through the voice channel while using the full capabilities of the interface 2000 (i.e., a smartphone) to facilitate richer interactions. System 10 can also reduce the number of disputes and pre-empts instances of mis-selling: consumers can be shown exactly what they are agreeing to on a clear display, preventing disputes over what was claimed in the voice channel.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for real-time multi-channel interaction, comprising:
    initiating a real-time communication session between a customer service representative (CSR) and an end user; using multi-channel communication between the CSR and the end user, wherein the multi-channel communication includes at least one voice channel and at least one data channel, wherein the at least one data channel is capable of receiving communication inputs from the end user through a user interface and generating communication outputs to the end user; and
    while maintaining the end user and the CSR on the at least one voice channel, performing a plurality of actions through the at least one data channel, the plurality of actions including:
        presenting information to the end user via the user interface;
        receiving a communication input from the end user through the dynamic user interface;
        analyzing the received communication input with an interaction engine using a set of analytics rules to generate a communication output;
        presenting the communication output to the end user via the user interface;
        allowing the end user to confirm an accuracy of the presented communication output via the user interface;
        transmitting, via the user interface, a request from the end user to modify the presented communication output;
        allowing the end user to interact with the CSR to modify the presented communication output displayed on the user interface through the maintained at least one voice channel; and
        displaying the modified communication output to the end user via the user interface, based on the interaction between the CSR and the end user; and
    alternating operation of the user interface between a handset mode and a speakerphone mode, wherein a speakerphone function on the voice channel is disabled when a user interface sensor detects that the end user raises the user interface up to the end user's face and the data channel is disabled when the user interface sensor detects use of handset mode.

2. The method of claim 1, the method further comprising alternating operation of the user interface between the handset mode and the speakerphone mode during the communication session.

3. The method of claim 1, further comprising preventing the CSR from accessing the user input.

4. The method of claim 1, wherein the handset mode is activated when the end user holds a user device up to the end user's face.

5. The method of claim 1 further comprising displaying options on the user interface; and allowing the user to select a desired option using the user interface.

6. The method of claim 1, wherein the voice channel is held open in both the handset mode and the speakerphone mode.

7. The method of claim 1, wherein the information is also presented to the user using audio through the voice channel.

8. A system for real-time multi-channel interaction, comprising:
    a processor; and
    a non-transitory computer readable medium programmed with computer readable code that upon execution by the processor causes the processor to execute a method for real-time multi-channel communication, comprising:
        initiating a real-time communication session between a customer service representative (CSR) and an end user;

using multi-channel communication between the CSR and the end user, wherein the multi-channel communication includes at least one voice channel and at least one data channel, wherein the at least one data channel is capable of receiving communication inputs from the end user through a user interface and generating communication outputs to the end user; and while maintaining the end user and the CSR on the at least one voice channel, performing a plurality of actions through the at least one data channel, the plurality of actions including:
presenting information to the end user via the user interface;
receiving a communication input from the end user through the user interface;
analyzing the received communication input with an interaction engine using a set of analytics rules to generate a communication output;
presenting the communication output to the end user via the user interface;
allowing the end user to confirm an accuracy of the presented communication output via the user interface;
transmitting, via the user interface, a request from the end user to modify the presented communication output;
allowing the end user to interact with the CSR to modify the presented communication output displayed on the user interface through the maintained at least one voice channel; and
displaying the modified communication output to the end user via the user interface, based on the interaction between the CSR and the end user; and alternating operation of the user interface between a handset mode and a speakerphone mode, wherein a speakerphone function on the voice channel is disabled when a user interface sensor detects that the end user raises the user interface up to the end user's face and the data channel is disabled when the user interface sensor detects use of handset mode.

9. The system of claim 8, wherein the method further comprises alternating operation of the user interface between the handset mode and the speakerphone mode during the communication session.

10. The system of claim 8, wherein the method for real-time multi-channel communication further comprises preventing the CSR from accessing the user input.

11. The system of claim 8, wherein the handset mode is activated when the end user holds a user device up to the end user's face.

12. The system of claim 8, the method for real-time multi-channel communication further comprises displaying options on the user interface; and allowing the user to select a desired option using the user interface.

13. The system of claim 8, wherein the voice channel is held open in both handset mode and the speakerphone mode.

14. The system of claim 8, wherein the information is also presented to the user using audio through the voice channel.

15. A non-transitory computer readable medium programmed with computer readable code that upon execution by a processor causes the processor to:

initiate a real-time communication session between a customer service representative (CSR) and an end user;
use multi-channel communication between the CSR and the end user, wherein the multi-channel communication includes at least one voice channel and at least one data channel, wherein the at least one data channel is capable of receiving communication inputs from the end user through a user interface and generating communication outputs to the end user; and while maintaining the end user and the CSR on the at least one voice channel, perform a plurality of actions through the at least one data channel, the plurality of actions including:
presenting information to the end user via the user interface;
receiving a communication input from the end user through the user interface;
analyzing the received communication input with an interaction engine using a set of analytics rules to generate a communication output;
presenting the communication output to the end user via the user interface;
allowing the end user to confirm an accuracy of the presented communication output via the user interface;
transmitting, via the user interface, a request from the end user to modify the presented communication output;
allowing the end user to interact with the CSR to modify the presented communication output displayed on the user interface through the maintained at least one voice channel; and
displaying the modified communication output to the end user via the user interface, based on the interaction between the CSR and the end user; and alternating operation of the user interface between a handset mode and a speakerphone mode, wherein a speakerphone function on the voice channel is disabled when a user interface sensor detects that the end user raises the user interface up to the end user's face and the data channel is disabled when the user interface sensor detects use of handset mode.

16. The non-transitory computer readable medium of claim 15, wherein the processor is further instructed to alternate operation of the user interface between the handset mode and the speakerphone mode during the communication session.

17. The non-transitory computer readable medium of claim 15, wherein the processor is further instructed to prevent the CSR from accessing the user input.

18. The non-transitory computer readable medium of claim 15, wherein the handset mode is activated when the end user holds a user device up to the end user's face.

19. The non-transitory computer readable medium of claim 15, wherein the processor is further instructed to display options on the user interface; and allow the user to select a desired option using the user interface.

20. The non-transitory computer readable medium of claim 15, wherein the voice channel is held open in both the handset mode and the speakerphone mode.

* * * * *